G. C. JETT.

TRACTOR.

Reissued Oct. 21, 1913. 13,634.

APPLICATION FILED SEPT. 22, 1913.

8 SHEETS—SHEET 1.

WITNESSES:

Julian H. Kending

A. Martin

INVENTOR.

George C. Jett

BY

Paul Synnestvedt

ATTORNEY.

Reissued Oct. 21, 1913.
G. C. JETT.
TRACTOR.
13,634.
APPLICATION FILED SEPT. 22, 1913.
8 SHEETS—SHEET 2.
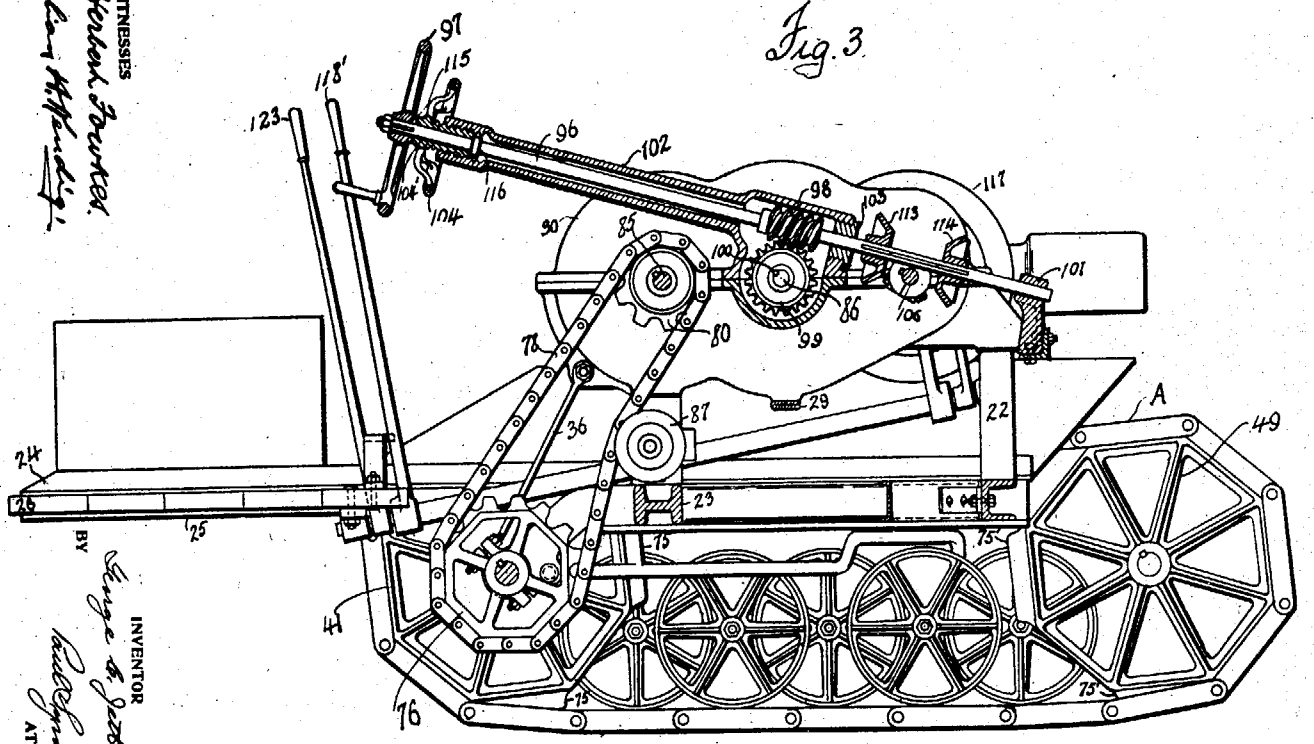
WITNESSES
W. Herbert Fowkes.
Julian H. Kending.
INVENTOR
George C. Jett
BY
Paul Synnestvedt
ATTORNEY

G. C. JETT.

TRACTOR.

Reissued Oct. 21, 1913.

13,634.

APPLICATION FILED SEPT. 22, 1913.

8 SHEETS—SHEET 8.

WITNESSES

W. Herbert Fowkes.

Julian H. Kending.

INVENTOR

George C. Jett

BY

Paul Synnestvedt

ATTORNEY

G. C. JETT.

TRACTOR.

Reissued Oct. 21, 1913. 13,634.

APPLICATION FILED SEPT. 22, 1913.

8 SHEETS—SHEET 4.

WITNESSES:

Julian H. Kendig

A. Martin

INVENTOR.

George C. Jett

BY

Paul Synnestvedt

ATTORNEY.

G. C. JETT.

TRACTOR.

Reissued Oct. 21, 1913. 13,634.

APPLICATION FILED SEPT. 22, 1913.

8 SHEETS—SHEET 5.

WITNESSES

Julian H. Kendig.

A. Martin

INVENTOR

George C. Jett

BY

Paul Synnestvedt

ATTORNEY

G. C. JETT.

TRACTOR.

Reissued Oct. 21, 1913.

13,634.

APPLICATION FILED SEPT. 22, 1913.

8 SHEETS—SHEET 6.

WITNESSES

W. Herbert Fowler

Julian H. Kending

INVENTOR

George C. Jett

BY

Paul Synnestvedt

ATTORNEY

G. C. JETT.

TRACTOR.

Reissued Oct. 21, 1913. 13,634.

APPLICATION FILED SEPT. 22, 1913.

8 SHEETS—SHEET 7.

WITNESSES:

Julian H. Harding

A. Martin

INVENTOR.

George C. Jett

BY

Paul Synnestvedt

ATTORNEY.

G. C. JETT.

TRACTOR.

Reissued Oct. 21, 1913. 13,634.

APPLICATION FILED SEPT. 22, 1913.

8 SHEETS—SHEET 8.

WITNESSES

W. Herbert Fowkes.

Julian H. Harding.

INVENTOR

George C. Jett

BY

Paul Synnestvedt

ATTORNEY

UNITED STATES PATENT OFFICE.

GEORGE CYRUS JETT, OF GARY, INDIANA.

TRACTOR.

13,634. Specification of Reissued Letters Patent. Reissued Oct. 21, 1913.

Original No. 1,071,427, dated August 26, 1913, Serial No. 681,237. Application for reissue filed September 22, 1913. Serial No. 791,259.

*To all whom it may concern:*

Be it known that I, GEORGE CYRUS JETT, a citizen of the United States, residing at Gary, in the county of Lake and State of Indiana, have invented certain new and useful Improvements in Tractors, of which the following is a specification.

My invention relates generally to an improved tractor which is particularly adapted for driving, propelling and operating all classes of farm implements and machines. It has for its primary objects the provision of an improved chain tread tractor peculiarly serviceable in soft and miry grounds, and over rough, stony or hilly country, which under conditions of hardest service delivers the highest possible efficiency of the motor power used in drawbar pull without agitating or disturbing the surface when passing over a pulverized surface; the provision of an improved tractor which is simple in construction and operation, and in the arrangement of its parts; the provision of a tractor which is economical in the use of power and at the same time delivers the highest possible efficiency of the motor power represented in pull at the drawbar in ratio to its weight; and the provision of a tractor in which all of the controlling mechanism is within easy reach and under full control of the operator.

One of the principal features of this invention is the novel means of transmission employed in its propulsion and in which varying speeds are attained and in which the movement of the machine in either direction may be accomplished in a straight line or in a curve, or if the advance is entirely cut out the tractor will turn on a pivot within its own length by means of the novel steering mechanism employed. The peculiar features of this improved transmission and steering mechanism constitute important features of this invention.

Among other novel features of my invention I have provided an improved chain tread tractor which is particularly adapted for traction purposes through rough or miry country, by reason of the long planes that the chain treads afford, thereby furnishing and bridging its own road across furrows and ditches; and also by hinging the chain tread driving members at the rear end this leaves them free and independent of each other, so that each member finds its own proper alinement on the ground. Again by giving long flat surfaces of large area in the treads, the tread members do not sink into and disturb the ground, thereby obviating an ensuing direct loss of power. Another feature is the provision of an oiling system for all parts of the transmission which are subject to the highest speed and to the greatest amount of wear.

The most economical value for the materials used in its construction is attained by compactness in the arrangement of parts and the giving of the general arrangement symmetrical outlines. All members carrying the heaviest loads are so arranged as to take care of the loads in the direction of the forces along which they occur, and the highest efficiency of the motor power used is obtained by making all members which come in contact with the ground a part of the driving force which is therefore delivered in drawbar pull.

These and other objects as may hereinafter appear or are incidental to my invention I attain by a construction illustrated in preferred form in the accompanying drawings, wherein:—

Figure 3 shows a sectional side elevation of Figure 2 on dotted line II—II and showing a sectional view of the steering post and part of the steering mechanism.

Figure 4 shows a front elevation assembled with the tread chain in place on one member and removed from the other member.

Figure 1:
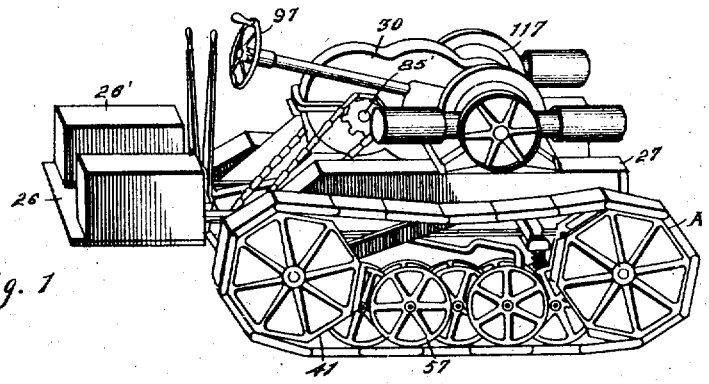
Figure 1 is a perspective view of the right side of the tractor as it appears assembled complete.
Figure 2:
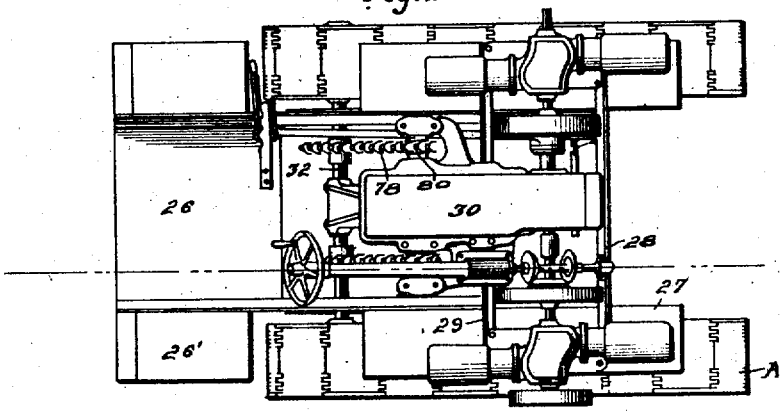
Figure 2 shows a plan view of Figure 1.
Figure 14:
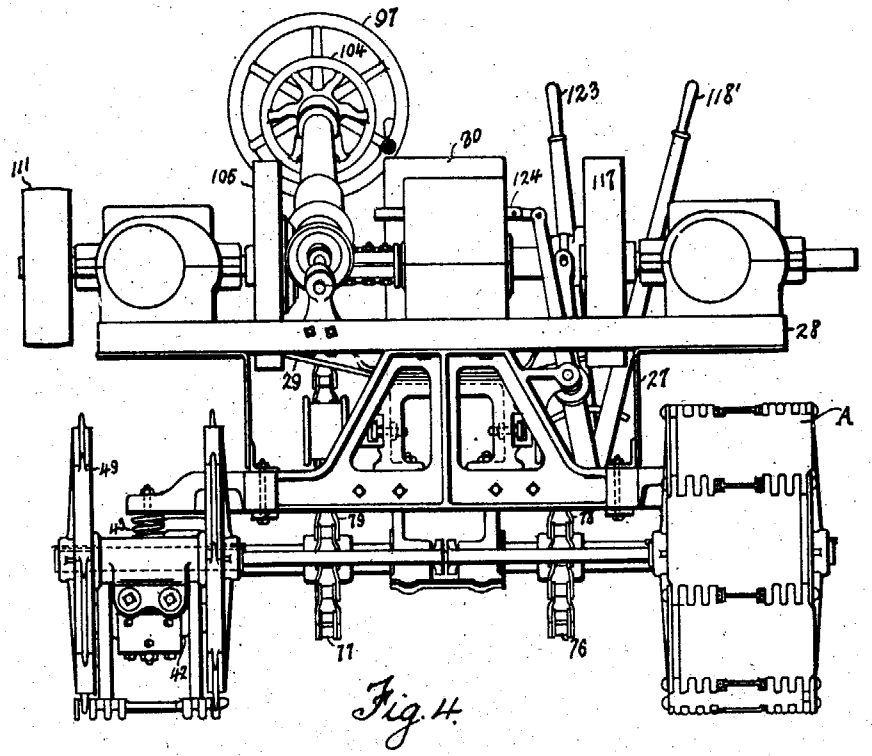
Figure 14 is a side elevation of Figure 13.
Figure 5:
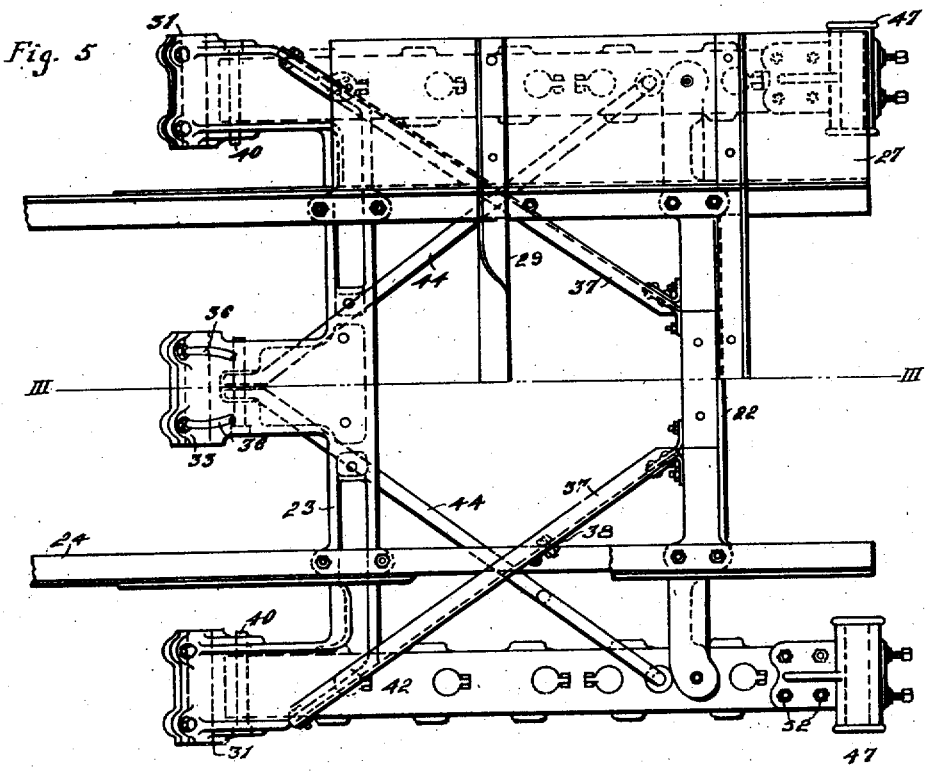
Figure 5 shows a plan view of the frame and frame members.

Referring to the drawings and particularly to Figures 1 to 6 inclusive it will be seen that I have provided a chain tread tractor having frame work members comprising a bolster 22 which forms the front transverse girder and a rear journal box girder 23 which forms the rear transverse girder. These front and rear girders are bolted to the undersides of longitudinal angle members 24 and to the upper sides of longitudinal bars 25, both these longitudinal members being extended rearwardly and form the cantilever beams which support the operator's platform 26 together with the tool boxes 26′, as shown in Figures 2 and 3. Guard plates 27 are secured to the vertical leg of angles 24 and are bent down at right angles to form a mud guard.

Extending the entire width from end to end of guard plates 27 are two transverse angle irons 28 and 29, each similar in every respect except that a portion of the vertical leg 29 is folded down on the horizontal leg and the member bent down in order to partly sustain a gear case 30 which is also supported by the truss member or girder 22 and the rear girder 23. The preferred location of the source of power is upon the horizontal surface of the guard plates 27. The ends of girder 23 are provided with journal boxes 31 and another journal 33 is placed at the center of this girder all affording bearings for the two-part axle 32. These journal boxes 31 and 33 are provided with bearing caps 34, bolts 35 and brace rods 36.

Channels 37 run from the outer extremities of rear girders 23 diagonally forward and are securely bolted to the bolster 22 in front. At the center of channels 37 clips 38 are securely bolted to the channel back through which is inserted bolts 39. The purpose of this is to give rigidity to all the chord members of this frame work through which this bolt passes. Holes for pins 40 are provided at the outer extremities of rear girder 23 and also in the center, juxtapositioned in front of the journal boxes 31 and 33. These three holes for the pins are preferably in a straight line.

Mounted on the axle 32 which is journaled in the journal boxes 31 and 33, are chain tread sprocket wheels 41 and running forward therefrom are longitudinal girders 42 which are mounted on the two outer pins 40 for free vertical movement within the limit of elasticity of weight carrying tension and compression springs 43, this arrangement supplying rigidity in the horizontal plane. The girders 42 are given free movement amount the two outer pins 40 and the center pin by means of the diagonal brace rods 44 which connect to the center pin 40 at one end and with the other extremity to the girder members 42 in a manner hereinafter set forth. The girders 42 form the back bone of the chain tread driving members, and the three pins 40 form the axis about which girders 42 and transverse brace rods 44 are free to move within the limits allowed by the springs 43.

The springs 43 are bolted at their upper ends to the outer extremity of bolster 22 and at the lower ends to the girders 42. Since these springs are secured at each end this allows them to serve the double purpose of tension and compression springs as the requirements may be in proceeding over rough or uneven roads.

For ease and simplicity in assembling the transverse brace rods 44 are taper turned at the extreme end which connects with wheel girder 42. If desired the hole which receives this end of the brace rod may be cored large enough in girder member 42 and the intervening space is then filled with Babbitt or other suitable low fusing metals. This affords easy and exact alinement of these parts without the accuracy in the workmanship which would otherwise be required. The taper end and nut on the end of the transverse brace rods permit easy removal. The cored hole 46 in girder 42 is shown clearly in Figure 8.

The forward ends of the girders 42 are provided with journal boxes 47 for axles 48 which carry the front chain tread sprocket wheels 49. Longitudinal adjustment is obtained by ways 50 and by elongated holes 51 in girder 42 and complementary holes and ways on journal bearing 47. This means of adjustment is provided in order to give proper tension to the chain tread, to take up for wear and to slack up in order to remove the tread chain from the sprocket wheels 41. This adjustment is effected by loosening up nuts on bolts 52 inserted through slotted holes, and by means of set screws 53. After the desired adjustment is made it is then securely locked in place by the bolts 52, the ways 40 insuring perfect longitudinal alinement for any position of the journal bearing 47 on girder 42.

Figure 6:
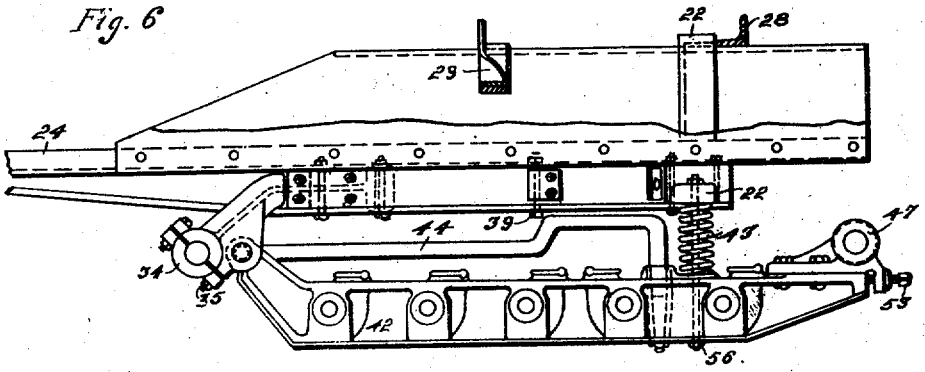
Figure 6 shows a side elevation of Figure 5 with all members above the broken line IV—IV sectioned on dotted line of III—III of Figure 5.
Figure 7:
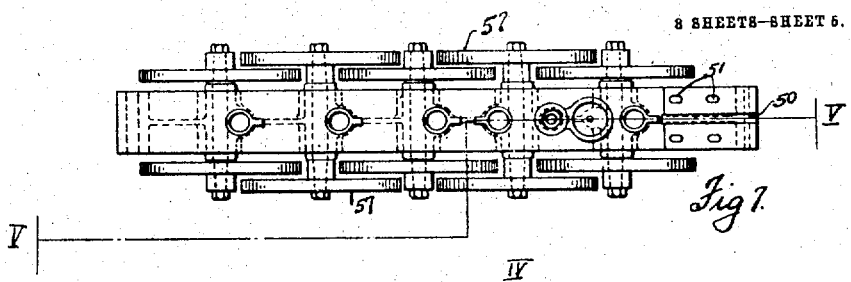
Figure 7 shows a plan view of the weight supporting wheels.
Figure 8:
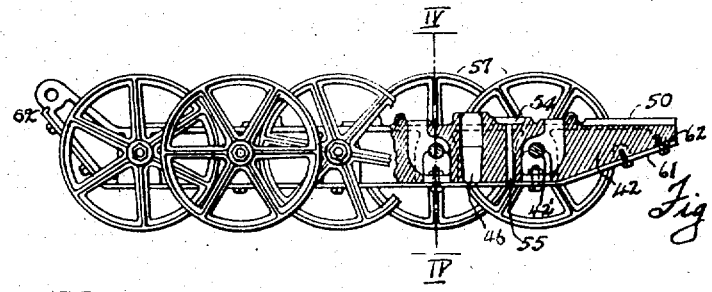
Figure 8 shows a side elevation of Figure 7, in the broken line V—V of Figure 7.

By a reference to Figures 6, 7 and 8, it will be seen that I provide springs 43 secured at their upper ends to the outer extremities of bolster 22, by means of bolts 56 passing therethrough and extending through holes 55 in the girders 42, the lower ends of the spring firmly secured against lateral movement in a seat 54 in the girders 42.

Girders 42 furnish the journal bearings 42′ for the weight carrying or bearing wheels 57, the latter being taper-bored and secured to axle 58 by nut 59. By my improved arrangement all axles and wheels are alike, except in the method of arrangement in that the long end of the hub is placed on the inner and outer side of alternate wheels. By following out this method the greatest diameter of wheels can be placed in the shortest distance between axes and ultimately the greatest number of wheels can be placed in position on the girder. This is an advantageous feature in that it gives the greatest possible number of contacts on the tread chain A. In my preferred construction the distance between contacts of weight carrying wheels is less than the length of the link on the tread chain A.

Figure 9:
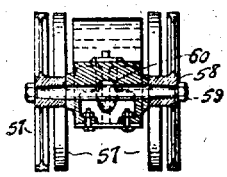
Figure 9 shows a vertical sectional view on broken line IV—IV of Figure 8.

By a reference to Figures 8 and 9 it will be seen that the journal box 42′ within girder 42 for the axle 58 is shown in detail, in which the upper side of the journal bearing is given a bearing space with a narrow core 60 on the upper side of the axle. This core increases in width all of which the girder will allow on the under side of the axle and extends through the under and upper sides of the girder. This core forms the oil pockets in which oily waste may be inserted, consequently axle 58 is under constant lubrication.

The several oil pocket openings on the under side of the girder are covered by one continuous cover plate 61 which performs the double duty of affording the bottom for the oily pockets and also acts as the bottom chord member of the girder. In order that this cover plate 61 be securely fastened to the girder as a preventative against creeping, keyways 62 are provided in the girder 42 at each end of the plate. At one end this plate is flanged over to insert the keyways 62 and in the other end similar keyways are cut in both girder and cover plate and securely locked together by a square key. This cover plate is also securely fastened by cap screws and through bolts at the most convenient places. The front end of the girder 42 is fitted to receive journal bearing 47 heretofore considered. This journal bearing is shown clearly in Figures 5 and 6.

Figure 10:
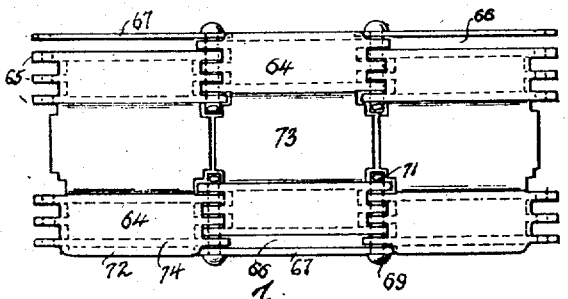
Figure 10 shows a plan view of the tread chain with three links assembled.
Figure 12:
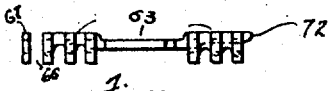
Figure 12 shows a front elevation of Figures 10 and 11.
Figure 11:
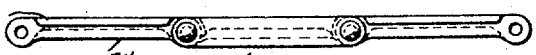
Figure 11 shows a side elevation of Figure 10.
Figure 22:
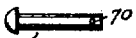
Figure 22 is a detail drawing showing the pintle of the chain tread.
Figure 13:
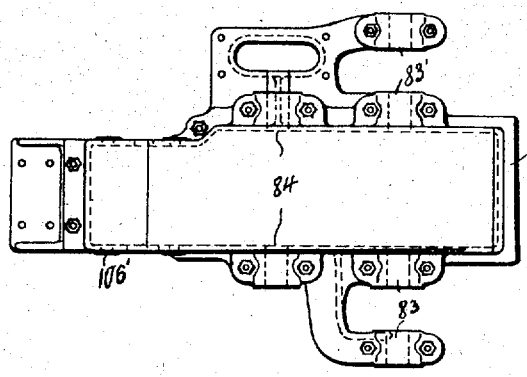
Figure 13 shows a plan of the transmission case.
Figure 14:
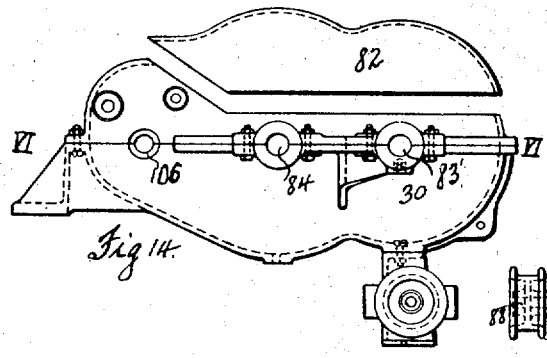
Figure 15:
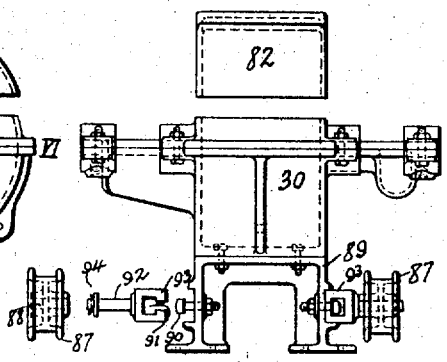
Figure 15 is a rear elevation of Figures 13 and 14.
Figure 16:
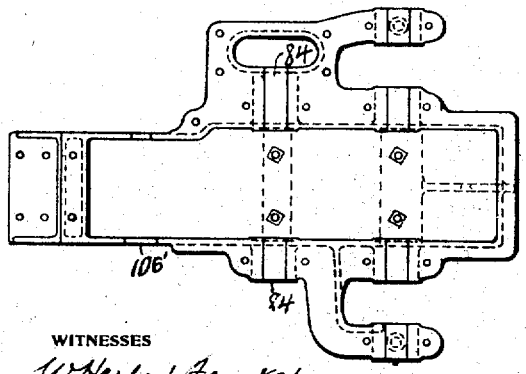
Figure 16 is a plan of the lower half of transmission case.
Figure 17:
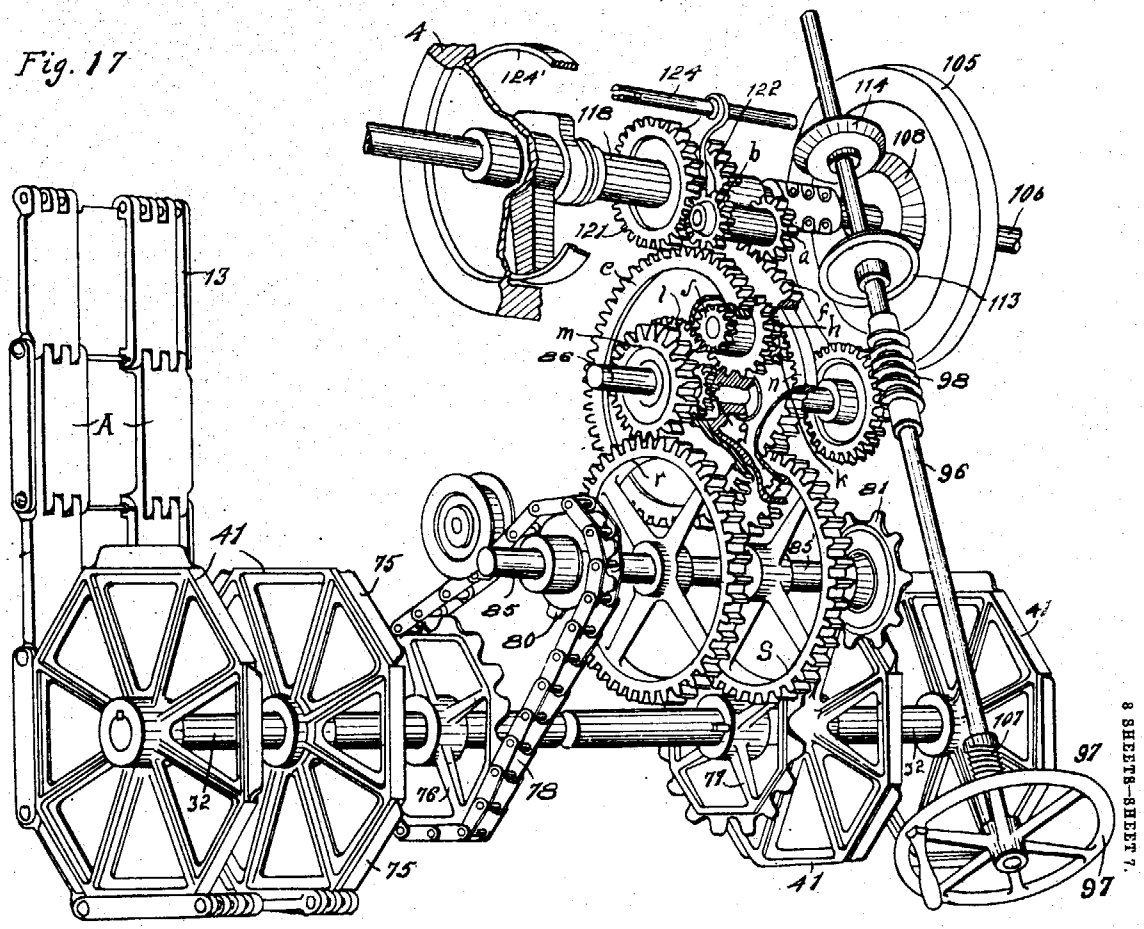
Figure 17 shows a perspective view of the members which are active in the transmission and differential.

My improved tractor is provided with a chain tread A, which is shown assembled in various figures and in detail in Figures 10, 11 and 12 to which reference is now particularly made, and in which 63 is the larger or main member and provided with the broad level planes 64 which when connected serve as a track for the weight carrying wheels 57. These planes 64 terminate in tongues or interlocking grooves 65. Preferably the distance between tongue and tongue in each link, or in other words the pitch of the grooves, is less than the face width of the weight carrying wheels 57. In each chain link the member 63 is identical in every respect, the same identity holding good with regard to the pitch of the grooves and the entire contour of each end of the link. Since this is so the link member 63 may be alternately turned one-half revolution with tongue and grooves engaging as shown in Figure 10. This engagement leaves alternate open spaces 66 which are bridged across by bars 67. These bars and tongues are provided with openings 68 which receive the pin or pintle 69. The end of the pin 69 may be provided with a hole 70 for the reception of a split cotter 71. Each link member is provided with a flange portion 72 which is on the same plane as the plane 64 and the upper edges of the bar 67. The object of this is to afford a smooth level track for the weight carrying wheels 57 to roll on. The pin or pintle 69 forms the axis about which the chain links bend. The center of web 73 between planes 64 is on the same plane with the axis of bend, and this insures the least perceptible opening between the ends of web members 73 between link and link. The flange portion 72 is carried out even with the outsides of bars 67 to give straight lines to the chain edges which includes plane 64 at the outer edges of chain members. Longitudinal ribs 74 may be inserted at the outer sides of link member 63 to add rigidity and strength thereto.

This complete assembled tread chain A is designed with the object of giving the greatest strength for the amount of material used, smooth joints, and continuous planes for the weight supporting wheels, and a chain tread with the fewest number of parts, which are easily assembled, and readily accessible should the removal and insertion of new parts be required. Another object of this chain tread is the provision of means which will afford the best grip on the ground covered and one which delivers the highest ratio of the total weight of the machine to tractive force, consistent with smooth running and economy in the use of power.

Referring to Figures 4 and 10 it will be seen that the tread chain A proper engages with the sprockets 75 of the sprocket wheels 41 by means of the alternate slots 66 in the chain tread A. The arrangement of the sprockets 75 on the sprocket wheels 41 is alternate in character to register with the alternate slots 66. The arrangement of the sprockets 75′ on the idler sprocket wheels 49 is similar to that in sprocket wheels 41.

Keyed to the shaft or axle 32 are drive sprocket wheels 76 and 77 which are connected by endless drive chains 78 and 79 to sprockets 80 and 81, which form part of the transmission and differential gear to be hereinafter explained. The periphery of chain tread sprocket wheels 41 is made up of a series of chords. The objectionable feature in a machine of this kind which usually is driven with a variable speed due to variable radial distance of the chain to the axis of rotation of the driving sprocket is overcome by giving to the sprocket wheels 76 and 77 an equal number of chords to that of the driven sprockets 41 and locating the chords of the former with respect to those of the latter, so that the chains 78 and 79 on sprocket wheels 76 and 77 and tread chain members A on sprocket wheels 41 are driving on their longest radii at the same instant and at their shortest radii at another instant, which stating it in other words, that 76 and 41 be so located on the shaft 32 that drive chain 78 and chain tread A will come tangent to the peripheral chords of 76 and 41 at the same instant. This arrangement gives constant and continuous velocity to chain tread A. To attain this result it is considered preferable that the number of sprockets in 76 and 77 be equally divisable by the number of chords thereon, and this arrangement is one of the several features of my invention.

By an inspection of the latter described mechanism it is evident that instead of using the preferred means shown, namely a two-part axle 32 and sprockets 76 and 77 keyed thereon, it would be permissible to use a one part stationary shaft with the sprockets and sprocket wheels rotatable thereon.

The casing 30 for the gear and shafts of the transmission and differential is clearly shown in Figures 13, 14, 15, 16 and 17. This gear case is made oil tight for the purpose of filling it sufficiently with oil so as to give a complete and continuous oiling system to all the transmission and differential members located therein, and is provided with a removable cover 82. This cover protects the transmission members within the case and at the same time renders them readily accessible for oiling or inspection. The gear case is parted on line VI—VI through the center of bearings 83, 83′, 84 and 106′ for shafts 85, 85′, 86 and 106, respectively. The sprockets 80 and 81 are respectively mounted on the shafts 85 and 85′. The gear case is not only supported at the three points previously mentioned but is also held in its proper place by the brace rods 36 as shown in Figures 2 and 3, which also serve the purpose of studs for the removable caps 34. Between the girder 23 and the lower side of the gear case 30 is a supporting member or chair 89 securely bolted in place. On either side of this chair 89 are driving chain tighteners 87 adjustably secured to it by means of the through bolt 90, the head of which engages with T-slot 91 at the base of spindle 92 of carrier 93 as clearly shown in Figure 15. Chain tightener pulley 87 has bearing 88 in its hub which is an easy moving fit on side spindle 92 and is held in position thereto by washer and cotter pin 94. The pulley 87 is longitudinally adjustable by means of the square head of bolt 95 engaging in T-slot 91 which runs the entire length of carrier 93.

Pulleys or wheels 111 are mounted on the power shaft and can be used in driving machinery directly from the motive power. This pulley is rigidly secured to the power shaft 106 by means of the key 112.

The means for steering the machine will now be taken into consideration and by reference to Figure 3 it will be seen that I have provided a steering post shaft 96, at the upper end of which a hand wheel 97 is rigidly keyed thereto. Screwed at a point intermediate the ends thereof is a worm 98. On the shaft 86 which moves in the bearings 84 is a worm gear 99 which is actuated by the worm 98. The steering and turning of the tractor is accomplished directly through the gear shaft 86 which is keyed to the worm gear 99 by a square key 100. The means by which the steering is accomplished is hereinafter set forth in connection with the differential gear in the transmission. For a better understanding for what immediately follows, a right hand rotation of the steering post shaft 96 directs the tractor in an opposite direction to that given by a left hand rotation. The steering of the tractor may be performed either by hand or by the application of power. The steering post shaft 96 is shown supported throughout its length in three places by suitable bearings. At its lower end it is supported by the outboard bearing 101 which is bolted through angle 28 on the frame. The shaft is inclosed in a steering post 102, the opening at the lower end of which is large enough to admit worm 98. This opening is provided with an internal threaded portion which engages a bearing 103 which has a corresponding threaded portion. The third bearing 104′ is within the hub of another hand wheel 104.

Figure 21:
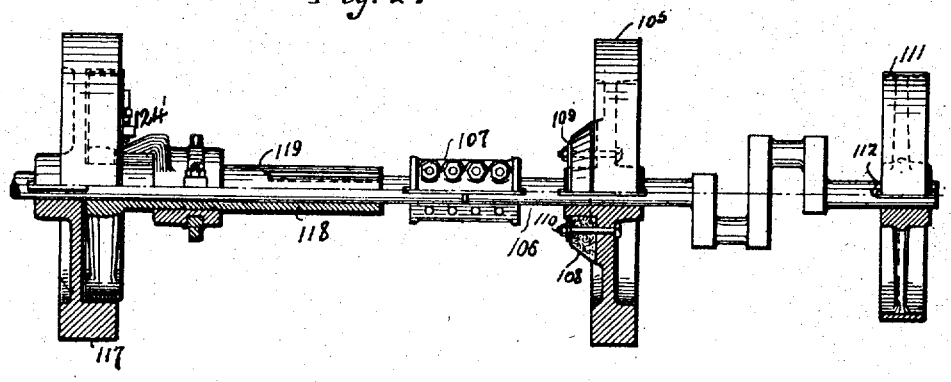
Figure 21 shows a plan view of the engine crank shafts.

Referring now more particularly to the means designed to effect the steering of the machine by the application of power, the source of which being preferably located upon the horizontal surface of the guard plates 27 and the preferred means shown are two gasolene engines of the two-cylinder opposed type. Fly wheel 105 is keyed to the engine shaft 106 on the steering post side. This shaft may be integral, or if otherwise may be connected together by the sleeve coupling 107. As shown in Figure 21 the fly wheel hub is extended to receive fiber friction cone 108 which is firmly held to the fly wheel by disk 109 and through bolts 110. The steering shaft 96 carries on it the two friction disks 113 and 114 which stand normally out of contact with friction cone 108 which is rotating.

The two lower bearings 101 and 103 provide an easy running fit on the shaft 96 which shaft is free to slide longitudinally along through these bearings, but the upper bearing 104′ prevents longitudinal sliding by means of the hub 115 of hand wheel 97 serving the purpose of a thrust collar at one end of the bearings and coöperating with the thrust collar 116 at the other end of the bearing.

The sleeve bearing 104′ is threaded on its outer periphery to engage corresponding threads in the steering post, so that by rotating hand wheel 104 the sleeve bearing within the hub is screwed into or out of steering post 102. This imparts a longitudinal movement to shaft 96 which carries the two friction disks 113 and 114. On rotating hand wheel 104 the shaft 96 is moved longitudinally through bearings 101 and 103 until the friction cone 113 contacts with the fiber friction cone 108 which in its rotation imparts motion by this contact with the friction cone 113 and which in turn actuates the worm gear shaft 86 through worm 98 and worm gear 99. Rotation of the hand wheel 104 in an opposite direction brings the friction disk 114 into contact with the fiber friction cone. By this contact the worm gear shaft 86 is driven in an opposite direction.

Figure 18:
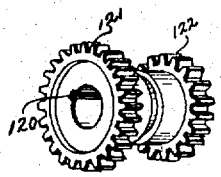
Figure 18 shows in perspective the drive gears as shown in Figure 17.
Figure 19:
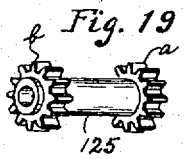
Figure 19 is a perspective of the back-up gears.

A fly wheel 117 is keyed on the shaft 106, the latter journaled in the bearing 106′. This shaft is also provided with a long tubular sleeve 118 which has an easy fit thereon, and is fitted with a key 119 to engage with keyway 120 in drive gears 121 and 122 as shown in Figure 18. These drive gears are slidably mounted on the clutch sleeve 118 but rotatable therewith. On this sleeve is mounted an expansion ring clutch 124′. Actuation of the lever 123 provides longitudinal movement of the driving gears 121 and 122 by means of the shifter 124, and on the operation of the lever 118′ in one direction the driving half of the clutch 124′ engages with the driven half thereof and ultimately rotates with it gears 121 and 122. Disengagement of the driving gears 121 and 122 is effected by a reverse action of the lever 118′, disengaging the driven gears from the power shaft 106.

The action of the clutch and the driving gears 121 and 122 as thus far described is that the transmission mechanism is actuated by these two gears which are slidably mounted on the sleeve 118 and free to move along the sleeve longitudinally, but compelled to rotate with the driven half of clutch and clutch sleeve 118 by the action of the key 119 in keyway 120. The fly wheel 117 or the driving clutch half, being connected to the power shaft is therefore driven by it.

Figure 20:
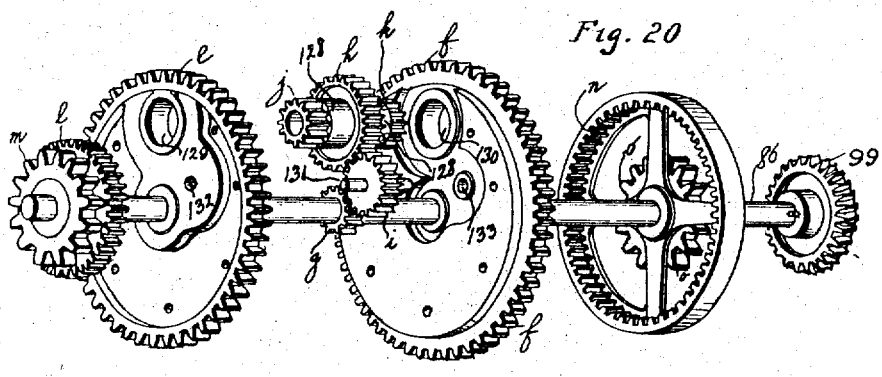
Figure 20 is a perspective of parts of Figure 17 showing the gears and members which are active in the differential, but disengaged and scattered along the shaft.

Figure 20 shows in perspective all the members in the differential and transmission disengaged and spread along the shaft upon which they rotate, the shaft being somewhat exaggerated to accommodate this view. The transmission mechanism is provided with two speeds forward and one reverse speed. On one end of a sleeve 125 is a back-up gear *a* which is in constant engagement with gear *f*, the latter being mounted on the shaft 86, and on the other end of the sleeve is a similar gear *b*. The sleeve 125 and gears *a* and *b* are substantially integral and the gear *b* is located at the correct position with respect to gear 121 in order to permit engagement. Assuming drive gears 121 and 122 to be in their extreme position at the end of clutch sleeve 118 and in this position the gear 121 engages with the gear *e* which is also mounted on the shaft 86. The transmission is then on high speed forward since the larger member of the driving gears is driving the smaller member of the driven gears. The rotation of gear 121 being considered counter-clockwise *e* will then be clockwise. By movement of gear shifter 124 gear 121 is moved out of engagement with gear *e* and simultaneously gear 122 is moved into engagement with gear *f*, the transmission is then on low speed forward since the smaller member of the driving gears is driving the larger member of the driven gears, the direction of rotation being the same as previously stated, resulting in the clockwise direction of gear *f*. By a similar and another movement of gear shifter 124, gear 122 is moved out of engagement with gear *f* and simultaneously drive gear 121 engages with back-up gear *b* which drives gear *f* through gear *a*. This reverse transmission is effected through the idlers *a* and *b* so that the operator by proper movement of the lever 123 which actuates the shifter 124 may obtain low or high speeds forward or reverse at will.

The webs 126 and 127 of the driven gears *e* and *f* form the bearing supports of the planetary gears of the differential, namely gears *h*, *i*, *j* and *k*. Gear *g* on the shaft 86 engages with the idler gear *i* which in turn engages with the gear *h*, resulting in the gears *h* and *g* having the same relative rotation, though at different velocities. Journals 128 have an easy moving fit in bearings 129 and 130 of gears *e* and *f* respectively. The diameters of journals 128 are preferably turned equally to or greater than the addendum circles of pinions *j* and *k*. The journals 131 of the idler gear *i* fit in corresponding bearings in *e* and *f*, and the latter are brought together in proper juxtaposition by the journals 131 fitting in bearings 132 and 133. The gears *e* and *f* are also secured together by suitable bolts, leaving pinions *j* and *k* projecting outside of bearings 129 and 130 respectively. Thus the planetary pinion *j* engages with the gear *l* which is rigidly connected to transmission gear *m* and in a like manner planetary pinion *k* engages with annular gear *n* which is rigidly secured to the transmission gear *o*.

The several gears *m*, *l*, *e*, *f*, *n* and *o* fit easily on shaft 86 which forms the axis about which these gears rotate. The gear *m* engages with the gear *r* which is keyed to shaft 85 which rigidly carries sprocket wheel 80 and on the opposite side of the transmission in like manner pinion *o* engages with gear *s*, the latter being keyed to shaft 85′ which rigidly carries the sprocket wheel 81.

Worm gear shaft 86 and hand wheel 97 are normally stationary and the only rotation the shaft receives is through worm 98 on the steering post shaft as previously set forth. The direction of rotation of transmission gears *m* and *o* are independent with respect to each other, but are controlled by the planetary gears through pinions *j* and *k* in engagement with *l* and *n* respectively.

Considering the advance cut off and it is desired that the tractor be turned on a pivot it will be seen that the gears *e* and *f* are stationary, so that on a rotation of the shaft 86 either by hand or by power, in a clockwise direction, then through the action of idler *i*, pinions *j* and *k* will also rotate clockwise and pinion *j* in engagement with *l* will drive the gear *m* counter clockwise. In a similar manner pinion *k* in engagement with annular gear *n* drives the gear *o* clockwise, therefore with gears *e* and *f* stationary a rotation of worm gear shaft 86 will rotate the gear *o* in the same relative direction, while the gear *m* will rotate in an opposing direction. Incidentally by inspection of Figure 20 it will be readily seen that there is considerable reduction of speed between the shaft 86 and the gears *m* and *o* respectively. By a continued actuation of the steering post shaft the tractor will turn about within its own length.

The action of the planetary gears with respect to the transmission gears when the tractor is moving in a straight line ahead or on the reverse will now be considered. With the shaft 86 stationary and drive gear 122 in engagement with gear *f* on forward position, then the gears *e* and *f* will rotate clockwise and the direction of rotation of gears *l* and *n* is the same with respect to that of *e* and *f*. This holds true with contrariwise rotation of the above members of the transmission. While the driven gear *f* rotates in the clockwise direction as above stated and carrying gear *e* in the same direction, the planetary pinions *j* and *k* have a slight perceptible rotation in a direction counter clockwise with respect to *e* and *f*. The pinion *k* engaging with the annular gear *n* causes the latter gear to rotate clockwise with respect to *e* and *f*, but at a slightly reduced speed, and in a similar manner spur gear *l* rotates clockwise with respect to *e* and *f*, but at a slightly higher speed. This statement holds equally true with gear 121 in engagement with back-up pinion *b* with contrariwise rotation of the above mentioned differential members. In other words when the transmission is on either high or low speed forward or at a reverse back-up speed and the shaft 86 stationary as before, the transmission pinions *m* and *o* rotate in the same relative direction, but at different relative velocities. This difference of velocity is compensated for in a manner more fully set forth hereinafter.

In order that the sprocket wheels 41 rotate in the same direction and at the same velocity, it is obvious that the drive sprockets 76 and 77 have the same direction and the same velocity. With an existing difference in the velocities between drive pinions *m* and *o* and an equal velocity a resultant for the drive sprockets 76 and 77, a compensation must be provided through the members of the transmission between and including the gear *o* to 77 on one side and between and including *m* to 76 on the other side. This compensation is made up on one side of the transmission through drive pinion *o*, gear *s*, sprocket 81 and sprocket 77 and on the other side of the transmission by drive pinion *m*, gear *r*, sprocket 80 and drive sprocket 76. The preferred location of compensation being in the sprockets 80 and 81; the preferred means a difference in their teeth ratios, one sprocket being provided with a greater number of teeth than the other.

The steering and turning of the tractor is accomplished by controlling the movement of the chain tread A on the ground. Equal velocities of chain tread member A drive the tractors straight ahead while unequal velocities of the chain tread members steer or turn the tractor in any desired direction.

We have considered the effect of the rotation of the gears *e* and *f* with respect to the ultimate directional rotation of the sprockets 41 and it will readily be seen that a rotion of the gear *g* on the shaft 86 coincident with that of *e* and *f* will result in an inequality in the number of revolutions of sprockets 76 and 77 necessarily communicated to the sprockets 41 and in turn to the chain tread member A. So that with the power cut in and the tractor moving in a forward or rearward direction a continuous rotation by manual or power means of the shaft 86 and the gear *g* will eventually turn the tractor around in a circle, inasmuch as it has a longer travel on the one side than on the other.

I have shown that with the power cut in and the gear *g* and gear shaft 86 stationary the slight resultant rotation of the differential planetary gears communicated to the gears *m* and *o* is fully compensated for, so that the sprocket wheels 41 have the same relative direction and velocity. A new factor is introduced when in addition the steering means are in actuation in that a rotation of the gear *g* results, and the differential planetary gears consequently rotate at a greater or lesser velocity than before, overcoming the provided compensatory means and resulting in one side of the tractor having a longer travel than on the other side.

Having thus described my invention and illustrated its use, what I claim as new and desire to secure by Letters Patent is the following:—

1. In a tractor or the like, the combination of a frame, a motor mounted on the frame, driving and driven shafts, a driving gear mounted on the driving shaft, a gear shaft mounted in the frame, a driven gear carried on the gear shaft and meshing with the said driving gear, spur gears *m* and *o* loosely mounted on the gear shaft and adapted to lock with the said driven gear, a differential gearing providing relative rotation to the said spur gears, traction wheels on the driven shaft, and a connection between the spur gears and the driven shaft.

2. In a tractor, the combination of a frame, a motor on the frame, a driving shaft, a driven axle, connections there-between, traction wheels mounted on the axle, a gear shaft mounted in the frame and carrying a worm gear rigidly secured thereto, and steering means comprising a steering shaft provided with a worm adapted to engage with the worm gear on the gear shaft, and differential gearing substantially as set forth and so arranged with respect to the gear shaft that on rotation of the steering shaft the traction wheels have relative movement with respect to each other.

3. In a tractor, the combination of a frame, a motor mounted in the frame, driving and driven shafts, wheels on the driven shafts, a driving gear slidably mounted on the driving shaft, a gear shaft mounted in the frame, steering means in operative engagement with the gear shaft, a driven gear on the gear shaft and meshing with the driving gear, a gear *g* rigidly secured to the gear shaft, differential gearing comprising the planetary gears *h*, *j* and *k* receiving rotative movement from the gear *g* and mounted for movement in bearings in the driven gear, a spur gear loosely mounted on the gear shaft and meshing with the gear *j*, an annular gear *n* loosely mounted on the gear shaft and engaging with the pinion *k*, compensatory sprockets having a relatively different number of sprocket teeth, and a connection between the sprockets and the driven shaft substantially as described.

4. In a tractor, the combination of a frame, driving and driven shafts, differential gearing, traction wheels on the ends of the driven shaft, a gear shaft mounted in bearings in the frame and carrying a gear *g* in operative relation with the said differential gearing, and steering means actuating the gear shaft whereby relative rotation is imparted to the traction wheels.

5. In a tractor having chain-tread members, the combination of a frame, driving and driven shafts, a differential mechanism, a compensatory connection between the differential mechanism and the driven shaft, sprocket wheels on the ends of the driven shaft engaging the chain-tread members, a gear shaft mounted in bearings in the frame and carrying a gear *g* in operative relation with the said differential mechanism, and steering means adapted to actuate the gear shaft whereby relative rotation is imparted to the chain-tread members.

6. In a motor or the like, the combination of a frame, driving and driven shafts in the frame, a differential mechanism, a connection between the driving and driven shafts, traction wheels on the ends of the driven shaft, a gear shaft mounted in bearings in the frame and carrying a gear *g* in operative relation with the said differential mechanism, a worm gear on the gear shaft, and a steering post suitably mounted in the frame and provided with a worm meshing with the said worm gear, so that on actuation of the steering post rotation is imparted to the gear shaft providing relative movement to the traction wheels with respect to each other.

7. In a tractor having endless chain-tread members; the combination of a frame, a motor in the frame, driving and driven shafts, a gear shaft mounted in the frame and rigidly carrying a gear *g*, a transmission gear revolubly mounted on the gear shaft and operatively connected with the driving shaft, planetary gears journaled in the transmission gear and actuated by the gear $g$, differential mechanism meshing with the planetary gears, sprocket wheels on the driven shaft in driving engagement with the endless chain members, steering means adapted to impart rotation to the gear shaft, and means to connect the transmission and differential mechanism with the said sprockets.

8. In a tractor, the combination of a frame, a motor in the frame, driving and driven shafts, traction wheels on the driven shaft, a gear shaft journaled in the frame and rigidly carrying a fixed gear $g$ thereon, transmission gearing revolubly mounted about the gear shaft and driven from the driving shaft, steering means adapted to impart rotation to the gear shaft, a differential gearing actuated by the said gear $g$ and normally locking with the transmission gearing, and means to connect the transmission and differential mechanism with the said traction wheels, so that when the transmission gear is stationary and the steering means actuated relative movement is imparted to the traction wheels.

9. In a tractor having endless chain-tread members, the combination of a frame, a motor in the frame, driving and driven shafts, a gear shaft journaled in the frame and carrying a fixed gear $g$, a transmission gear revolubly mounted on the gear shaft and operatively connected with the driving shaft, differential mechanism comprising the annular gear $n$ and spur gear $l$, gear $h$ meshing with the fixed gear $g$, said gear $h$ being journaled in the transmission gear and carrying pinions $j$ and $k$ adapted to mesh with the spur gear $l$ and annular gear $n$ respectively, sprocket wheels on the ends of the driven shaft engaging with the endless chain member, steering means adapted to actuate the gear shaft imparting relative rotation to the gears $l$ and $n$, connections between the gears $l$ and $n$ and the said sprocket wheels, so that when the transmission gear is stationary and the steering means actuated, relative movement is imparted to the chain tread member through the sprocket wheels thereby turning the tractor; or if the steering means is stationary and the transmission gearing has rotation in a right hand direction, the gears $l$ and $n$ have similar right hand movement through the locking pinions $j$ and $k$ so that the tractor has movement in a straight line.

10. In a tractor, the combination of a frame, a motor in the frame, driving and driven shafts, a gear shaft journaled in the frame and carrying a rigid gear $g$, a transmission gearing revolubly mounted on the gear shaft and operatively connected with the driving shaft, differential mechanism comprising the annular gear $n$ and the spur gear $l$, said annular gear and spur gear having different diameters, a planetary gear $h$ having movement about its own axis and turning bodily about the gear shaft, said gear $h$ engaging with the gear $g$ and journaled in the transmission gearing and further provided with pinions $j$ and $k$ adapted to mesh with the gears $l$ and $n$ respectively, traction wheels on the driven shaft, steering means actuating the gear shaft and adapted to impart relative rotation to the gears $l$ and $n$ with respect to each other, connections between the gears $l$ and $n$ and the said traction wheels, compensatory gears located in the said connections and between the said last gears and the said traction wheels, all so arranged that with the steering means and gear shaft normally stationary and the power cut in, the pinions $j$ and $k$ lock with the gears $l$ and $n$ so that the traction wheels have similar rotation in the same direction.

11. In a tractor the combination of a frame-work carrying a motor mounted thereon, a driving shaft, a driving gear on the shaft, a divided driven shaft, traction members on the ends of the divided shaft, a gear shaft journaled in the frame-work provided with a rigid gear $g$, a driven gear revolubly mounted on the gear shaft and adapted to engage with the said driving gear, steering mechanism comprising means to actuate the gear shaft which in turn imparts rotation to a differential gearing, said differential gearing consisting of a spur gear $l$ and an annular gear $n$ revolubly mounted about the gear shaft, a planetary gear $h$ carrying integral pinions $j$ and $k$ and having a journaled surface mounted for rotation about its own axis in a bearing in the said driven gear and turning bodily about the gear shaft, the said pinions $j$ and $k$ meshing with the gear $l$ and annular gear $n$ respectively, a connection between the gears $l$ and $n$ and the traction wheels, so that on actuation of the driven gear when the gear shaft is normally stationary the said pinions $j$ and $k$ are in locking relation with the gears $l$ and $n$ whereby the traction members have similar movement in the same direction, or if the transmission mechanism is stationary and the steering means actuated the tractor will turn about in its own length, or if the transmission mechanism and the steering means are both in operation at the same time the tractor has movement in a substantially oblique or circular direction.

12. In a gear for tractors, the combination of a frame, an axle journaled in the frame, traction members fast on said axle, a drive shaft having driving pinions of different diameters slidably mounted thereon but rotatable therewith, a gear shaft on the frame, different-sized gears loose on the gear shaft, an actuating gear keyed on the gear shaft in operative relation with steering mechanism, differential mechanism having pinions journaled in the webs of the said different-sized gears adapted to be actuated by rotation of the gear shaft, said differential mechanism including a spur gear *l* and an internal gear *n* loose on the shaft and meshed with the said pinions, a seconary shaft, compensating means on the secondary shaft, connections between the compensating means and the differential mechanism, and between the compensating means and the traction members.

13. In a motor car or the like the combination of a frame, a motor on the frame, a power shaft, a driven axle, a connection between the motor and the axle, traction members mounted on the axle, and steering means comprising a steering shaft provided with a worm thereon and in engagement with a worm gear mounted on a worm gear shaft, and differential gearing substantially as described and all so arranged with respect to the worm gear shaft that on rotation of the steering shaft the traction members on the ends of the axle have rotation in opposite directions with respect to each other.

14. The combination in a motor car, of a frame, a driving shaft and a driven shaft, connections there-between, traction wheels keyed on the driven shaft, and steering means comprising a steering shaft provided with friction wheels alternately adapted to peripherally contact with friction means on the driving shaft, a gear shaft 86 actuated by the steering shaft, sprockets mounted in the frame and in operative relation with the gear shaft, connections between the sprockets and the driven shaft, and means to differentiate the rotation of said sprockets whereby the traction wheels on opposing sides of the motor car will rotate in opposing directions with respect to each other.

15. In a motor car or the like, the combination of a frame, a motor mounted in the frame, driving and driven shafts, sprocket wheels on the driven shaft, chain tread members rotatable with the sprocket wheels, and transmission means comprising driving gears slidably mounted on the driving shaft but rotatable therewith, driven gears mounted for alternate engagement with the driving gears, means to engage and disengage the said gears respectively, spur gears rotatable with respect to the driven gears and having the same axis of movement therewith, compensatory sprockets engaging with the said spur gears, and connections between the sprockets and the sprocket wheels on the driven shaft.

16. In a machine of the class described, the combination of a frame, a motor mounted thereon, driving and driven shafts, wheels mounted on the driven shafts, chain tread members rotatable with the sprocket wheels and transmission means comprising the driving gears 121 and 122 slidably mounted on the driving shaft and rotatable therewith, the gears *e* and *f* located with respect to the gears 121 and 122 for alternate engagement, means to disengage the said gears respectively, back-up or reverse gears *b* and *a*, means to effect engagement and disengagement of the reverse gears with driving and driven gears, gears *m* and *o* rotatable with respect to *e* and *f* and sprockets 80 and 81 meshing with the gears *m* and *o*, connections between the sprockets and the driven shaft substantially as described.

17. In a motor car or the like, the combination of a frame, a motor mounted in the frame, driving and driven shafts, wheels on the driven shafts, and coöperating transmission and differential steering means comprising driving gears 121 and 122 slidably mounted on the driving shaft, a steering shaft mounted in suitable bearings on the frame, a gear shaft adapted to receive rotation from the steering shaft, the driven gears *e* and *f* mounted for alternate engagement with the driving gears 121 and 122 respectively, gear *g* keyed to the gear shaft rotatable therewith and engaging with the idler gear *i*, differential gearing comprising the gears *h*, *j* and *k* having journaled surfaces mounted for movement in bearings in the gears *e* and *f*, spur gear *l* loosely mounted on the gear shaft and meshing with the pinion *j*, annular gear *n* loosely mounted on the gear shaft engaging with the pinion *k*, the gears *m* and *o* loosely fitted on the gear shaft, but rigidly secured to the gears *l* and *n* respectively, compensatory sprockets respectively meshing with the gears *m* and *o* and connections between the sprockets and the driven shafts substantially as set forth.

18. In a tractor having a frame and a motor therein; the combination of a driving shaft having a friction wheel, a divided driven shaft, connections between the driving and driven shafts, traction wheels rigidly secured to the ends of the driven shaft, a gear shaft, steering means comprising a steering post operatively engaging with the gear shaft and having slight longitudinal movement in suitable bearings in the frame, said post having friction disks rigidly mounted thereon and adapted to peripherally engage with the said friction wheel, and differential means actuated by the gear shaft whereby the traction wheels on opposing sides of the tractor have relative movement with respect to each other.

19. In a tractor having a frame, and a motor therein; the combination of a driving shaft having a friction wheel, a divided driven shaft, connections between the driving and driven shafts, traction wheels rigidly secured to the ends of the driven shaft, a gear shaft, steering means comprising a steering post operatively engaging with the gear shaft and having slight longitudinal movement in threaded bearings in the frame, said post having a pair of friction disks rigidly mounted thereon and adapted to alternately engage with the said friction wheel, and differential gearing actuated by the gear shaft so that the traction wheels on opposing sides of the tractor have relative movement with respect to each other.

20. In a tractor having chain-tread members on opposing sides thereof; the combination of a frame, a motor on the frame; a driving shaft, a divided driven shaft, sprocket wheels keyed on the ends of the driven shaft and having a driving engagement with the said chain-tread members, a gear shaft provided with a fixed gear *g*, coöperating transmission and differential mechanism, the said transmission mechanism comprising driving and driven gearing and the said differential mechanism consisting of a spur gear and an annular gear adapted to receive relative rotation through planetary gearing journaled in the driving gearing, the spur and annular gears rotating in the same direction with the driving gear when the gear shaft is normally stationary, and connections between the transmission and the chain tread members.

21. In a tractor having chain-tread members on opposing sides thereof; the combination of a frame, a motor on the frame, a driving shaft, a two-part axle, sprocket wheels keyed on the ends of the axle and having a driving engagement with the said chain-tread members, a gear shaft provided with a fixed gear *g*, coöperating transmission and differential mechanism, the said transmission mechanism comprising driving and driven gearing and the said differential mechanism consisting of a spur gear and an annular gear adapted to receive relative rotation through planetary gearing journaled in the driven gearing, the spur and annular gears rotating in the same direction with the driven gear when the gear shaft is normally stationary, connections between the transmission and the chain-tread members, and steering means to actuate the gear shaft.

22. In a motor car or the like having a frame and a motor thereon; the combination of driving and driven shafts, traction wheels on the driven shafts, coöperating transmission and differential mechanism, a gear shaft adapted to actuate the differential mechanism, said differential locking with the transmission and having substantial similar movement therewith when the gear shaft is stationary.

23. In a motor car or the like having a frame and a motor mounted on the frame; driving and driven shafts and connections therebetween, traction wheels on the driven shafts, co-acting transmission and differential mechanism, a gear shaft adapted to actuate the differential, said differential locking with the transmission when the gear shaft is stationary, and so arranged that when the gear shaft is actuated the traction wheels have relative movement with respect to each other.

24. In a tractor driving and driven shafts, traction members on the driven shafts, a driving gear on the driving shaft, a jack shaft journaled in the frame and adapted to receive actuation from steering mechanism, gearing driven from said driving gear with gears *l* and *n* revoluble co-axially about said jack shaft, a planetary gear carried in the driven gearing to mesh with the gears *l* and *n*, connections between the jack shaft and driven shafts, and a pinion rigid with the jack shaft and in operative relation with the said planetary gear, whereby an actuation of the steering mechanism the movement of one traction member is differentiated from the other, substantially as and for the purpose set forth.

In testimony whereof I have hereunto signed my name in the presence of the two subscribed witnesses.

GEORGE CYRUS JETT.

Witnesses:
W. Herbert Fowkes,
M. H. Erickson.